(No Model.)
J. H. LONG.
FENCE.
No. 526,927.
Patented Oct. 2, 1894.
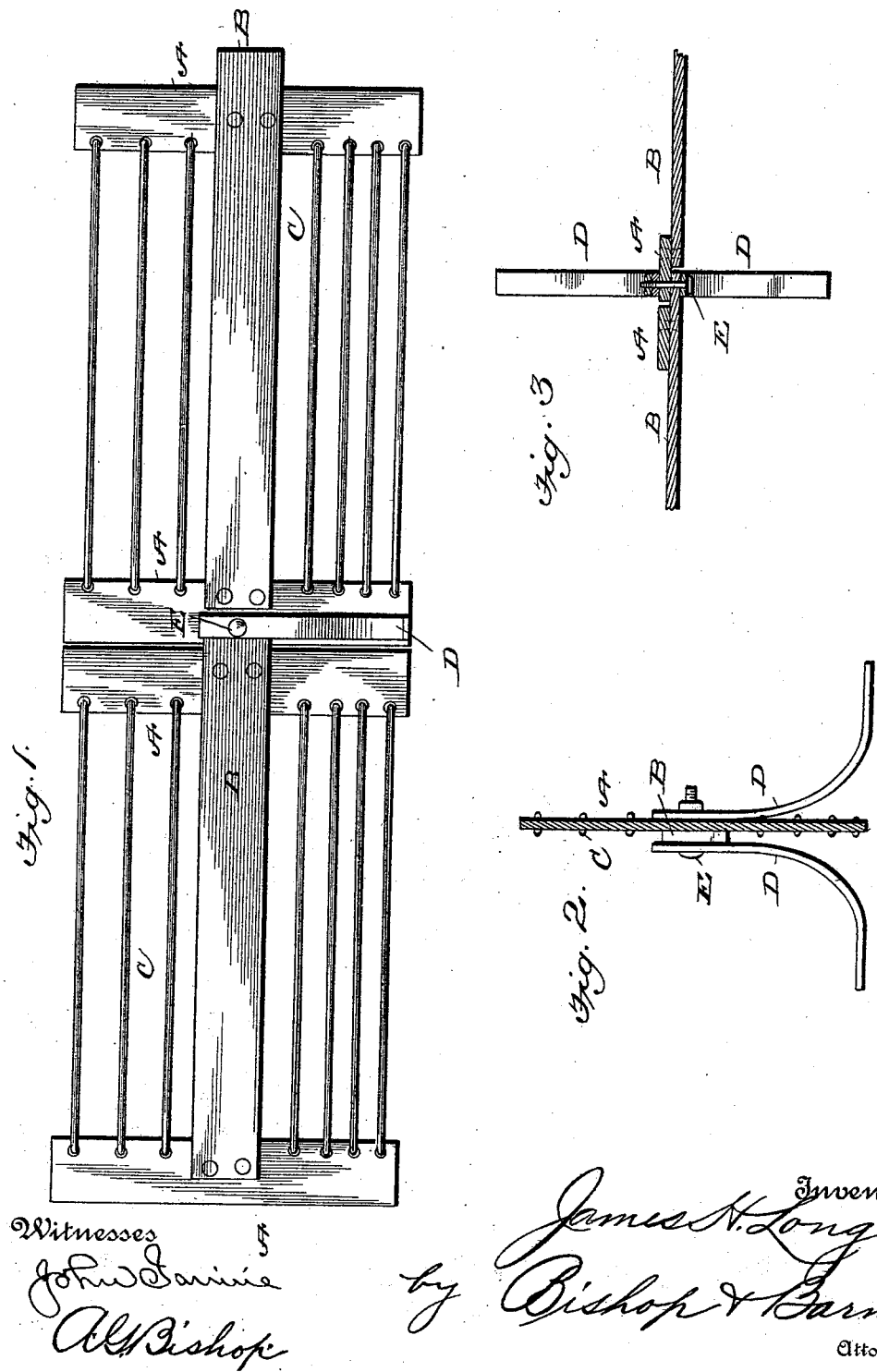
Witnesses
Inventor
James H. Long
by Bishop & Barnes
Attorneys

UNITED STATES PATENT OFFICE.

JAMES H. LONG, OF LITER, ILLINOIS.

FENCE.

SPECIFICATION forming part of Letters Patent No. 526,927, dated October 2, 1894.

Application filed June 6, 1894. Serial No. 513,682. (No model.)

*To all whom it may concern:*

Be it known that I, JAMES H. LONG, a citizen of the United States, residing at Liter, in the county of Morgan and State of Illinois, have invented certain new and useful Improvements in Fences; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention is an improved portable fence and it consists in certain novel features hereinafter described and claimed.

In the annexed drawings, which fully illustrate the invention, Figure 1 is a side view of my improved fence. Fig. 2 is a vertical transverse section of the same, and Fig. 3 is a detail horizontal section thereof.

In constructing a panel of my improved fence, I employ two bars, uprights or stiles A A which may be of any suitable material but are preferably metallic plates. These uprights are connected centrally by a longitudinal bar B and above and below said bar wires C are secured to and stretched between them. The central bar B is so arranged that one end projects slightly beyond the upright to which it is secured and is adapted to lap over against the adjacent upright of the adjoining panel while its opposite end terminates a short distance from the edge of the upright to accommodate such overlapping. Braces or feet D are secured, at their upper ends, to the upright at one end of each panel and have their lower ends resting on the ground or driven into the same to support the fence. It will be observed, upon reference to Fig. 2, that the upper ends of the braces or feet are brought against the side of the upright and the end of the longitudinal bar respectively and a single bolt E inserted through both braces, the upright and the bar to secure the several parts together.

It will be noted that I have provided a fence which can be rapidly put together and will be very strong and durable, at the same time offering a minimum resistance to high winds. The fence will consequently resist the efforts of stock to dislodge it and will not be blown over by the wind. The bars, uprights or stiles of adjacent panels are placed slightly apart so that the fence may adjust itself to inequalities in the surface of the ground.

The fence is especially desirable as a portable fence to be placed around stock pens, hay stacks, &c., and its advantages are thought to be obvious.

Having thus described my invention, what I claim, and desire to secure by Letters Patent, is—

The improved fence herein described and shown consisting of uprights or stiles, central horizontal bars secured to said uprights or stiles and having their opposite ends arranged respectively between the edges of one of the uprights or stiles and projecting beyond the opposite upright or stile and overlapping the adjacent upright or stile of the adjoining panel, braces arranged on opposite sides of the line of the fence and having their upper ends bearing against the overlapped upright or stile and the overlapping end of the horizontal bar, a single securing bolt inserted transversely through the overlapping end of the horizontal bar, the overlapped upright or stile and the upper ends of both braces, and line wires secured to the uprights or stiles and extending between the same above and below the central horizontal bar.

In testimony whereof I affix my signature in presence of two witnesses.

JAMES H. LONG.

Witnesses:
CHARLES A. BARNES,
M. FOX.